(12) United States Patent
Piao et al.

(10) Patent No.: US 6,484,528 B1
(45) Date of Patent: Nov. 26, 2002

(54) AIR-CONDITIONER

(75) Inventors: Chun-cheng Piao, Osaka (JP); Manabu Yoshimi, Osaka (JP); Ryuichi Sakamoto, Osaka (JP); Kazuo Yonemoto, Osaka (JP); Shotaro Mishina, Osaka (JP); Akira Kamino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/868,246

(22) PCT Filed: Dec. 9, 1999

(86) PCT No.: PCT/JP99/06934
§ 371 (c)(1),
(2), (4) Date: Jun. 15, 2001

(87) PCT Pub. No.: WO00/36346
PCT Pub. Date: Jun. 22, 2000

(30) Foreign Application Priority Data

Dec. 16, 1998 (JP) ........................... 10-357373

(51) Int. Cl.$^7$ ............................. F25B 13/00; F25D 9/00
(52) U.S. Cl. ...................... 62/324.2; 62/402; 62/324.5
(58) Field of Search .................. 62/401, 402, 86, 62/87, 324.1, 324.2, 324.5

(56) References Cited

U.S. PATENT DOCUMENTS

| | | | |
|---|---|---|---|
| 4,265,397 A | * | 5/1981 | Rannenberg ................ 237/2 B |
| 4,295,518 A | * | 10/1981 | Rannenberg ................... 165/2 |
| 4,444,018 A | * | 4/1984 | Kinsell et al. ................. 62/87 |
| 4,444,021 A | * | 4/1984 | Kinsell et al. ................. 62/95 |
| 4,445,639 A | * | 5/1984 | Kinsell et al. ................ 237/81 |
| 4,539,816 A | * | 9/1985 | Fox ................................ 62/87 |
| 5,121,610 A | * | 6/1992 | Atkinson et al. ............. 62/151 |
| 5,642,629 A | * | 7/1997 | Ohman ........................ 62/401 |

FOREIGN PATENT DOCUMENTS

| | | |
|---|---|---|
| EP | 45144 | 2/1982 |
| GB | 223732 | 5/1991 |
| JP | 62 223573 | 10/1987 |
| JP | 6-213521 | 8/1994 |
| WO | WO 94/05846 A1 * | 3/1994 |

OTHER PUBLICATIONS

A>U> Gigiel et al, "Air Cycle Refrigeration", AIRAH Journal, pp16–21, Jun. 1997.*
Japanese Association of Refrigeration, :Jar Hand Book Fundamentals, Fourth Edition, Japanese Association of Refrigeration, pp. 45–48, 1981.
A.U. Gigiel, et al., "Air cycle refrigeration", Airah Journal, pp. 16–21, 1997.

* cited by examiner

*Primary Examiner*—William C. Doerrler
(74) *Attorney, Agent, or Firm*—Nixon Peabody LLP; Donald R. Studebaker; Jerome W. Massie, IV

(57) ABSTRACT

A compressor (21), a heat exchanger (30), a demoisturizer (22), and an expansion device (23) are duct connected in that order to form a heat source-side system (20). The compressor (21) draws and compresses outdoor air and exhaust air for ventilation. The compressed air is subjected to heat exchange with air for conditioning in the heat exchanger (30). The compressed air is demoisturized in the demoisturizer (22). Thereafter, the compressed air is expanded in the expansion device (23), changes to low-temperature air, and then is expelled to outside the room. On the other hand, the conditioning air is delivered, through an inlet duct (43), to the heat exchanger (30). The conditioning air is a mixture of supply air for ventilation and air in the room. The conditioning air is subjected to heat exchange with the compressed air in the heat exchanger (30), whereby the conditioning air is heated. Further, the conditioning air is humidified in a humidifying part (42). Thereafter, the conditioning air is supplied into the room for effecting room heating.

14 Claims, 3 Drawing Sheets

AIR-CONDITIONER

TECHNICAL FIELD

The present invention relates to an air cycle air-conditioning apparatus employing air as a refrigerant for effecting heating and, more particularly, to a heating capacity improving scheme.

BACKGROUND ART

There has been conventionally known a refrigerating apparatus of the air cycle type employing air as a refrigerant. One example of such an air cycle refrigerator is shown in "JAR HANDBOOK, FUNDAMENTALS, Fourth Edition", published by Japanese Association of Refrigeration, pp. 45–48. Further, there is disclosed in "June Issue of the AIRAH JOURNAL (1997)", pp. 16–21, published by The Australian Institute of Refrigeration Air Conditioning and Heating a heating apparatus capable of performing heating by using an air cycle refrigerator as a heat source. Hereinafter, a description of this heating apparatus will be given below.

As shown in FIG. 3, the heating apparatus has a heat source-side system (a) and an exhaust heat-side system (f). The heat source-side system (a) is formed by sequential connection of a compressor (b), a first heat exchanger (c), a second heat exchanger (d), and an expansion device (e), for performing an air refrigerating cycle. On the other hand, the exhaust heat-side system (f) is formed by sequential connection of the second heat exchanger (d), a humidifier (g), and the first heat exchanger (c).

In such an arrangement, when the compressor (b) is driven in the heat source-side system (a), exhaust air for ventilation is compressed in the compressor (b). The compressed air flows through the first heat exchanger (c) and then through the second heat exchanger (d), undergoes expansion in the expansion device (e), and is expelled to outside the room. On the other hand, in the exhaust heat-side system (f), supply air for ventilation from the outside of the room flows through the second heat exchanger (d), the humidifier (g), and the first heat exchanger (c) in that order, during which the supply air is heated by heat exchange with the compressed air in the heat source-side system (a) in both the heat exchangers (d, c) and humidified in the humidifier (g). Then, the heated, humidified supply air is supplied into the room for effecting heating.

PROBLEMS TO BE SOLVED

However, the heating apparatus stated above suffers problems such as insufficient heating capacity and therefore fails to properly provide room heating. This problem will be described. In the heating apparatus, only the exhaust air for ventilation is let to flow to the heat source-side system (a). The amount of such ventilation is determined by, for example, the number of people present in the room (for example, 4 m$^3$/hr for every 1 m$^2$ of floor space), independent of the heating load. And, in most cases, only a flow of exhaust air for ventilation is insufficient for the purpose of achieving a heating capacity in proportional to the heating load. However, it is impossible for the heating apparatus to provide a flow of air at increased flow rates to the heat source-side system (a), therefore giving rise to lack of heating capacity.

Bearing in mind such drawbacks, the present invention was made. Accordingly, an object of the present invention is to ensure that an air-conditioning apparatus which performs heating by making utilization of an air cycle provides sufficient heating capacity.

DISCLOSURE OF THE INVENTION

According to an arrangement of the present invention, together with exhaust air for ventilation, air from the outside of a room (outdoor air) is let to flow to a heat source-side system which generates heat by making utilization of an air cycle, for achieving an increased air flow rate in the heat source-side system.

More specifically, the present invention provides a first solution means that is directed to an air-conditioning apparatus which heats room air by an air cycle employing air as a refrigerant for performing air-heating. The air-conditioning apparatus of the first solution means comprises a compressor (21) which draws in air from the outside and the inside of a room for compressing the drawn air, a heating means (30) which heats air for conditioning formed of at least air from the room by heat exchange with the compressed air compressed by the compressor (21), and an expansion device (23) which provides expansion of the compressed air which has undergone the heat exchange in the heating means (30), wherein low-temperature air, expanded and lowered in temperature in the expansion device (23), is expelled to the outside of the room, whereas the conditioning air heated by the heating means (30) is supplied into the room.

Further, the present invention provides a second solution means according to the first solution means, wherein the air that is drawn into the compressor (21) from the inside of the room is exhaust air that is expelled from the inside of the room for ventilation.

Further, the present invention provides a third solution means according to the first solution means or the second solution means, wherein the conditioning air is formed of air from the room and supply air that is supplied from the outside to the inside of the room.

Further, the present invention provides a fourth solution means according to any one of the first to third solution means, the fourth solution means including a demoisturizing means (22) which has a separation membrane, the separation membrane being formed such that water vapor in the air is allowed to pass therethrough from a high partial pressure of water-vapor side to a low partial pressure of water-vapor side thereof, for separation of water vapor contained in the compressed air without causing the water vapor to undergo condensation.

Further, the present invention provides a fifth solution means according to the fourth solution means, wherein the separation membrane is composed of a polymeric membrane and formed so as to allow water vapor to pass therethrough by water-molecule diffusion in the membrane.

Further, the present invention provides a sixth solution means according to the fourth solution means, wherein the separation membrane has a large number of pores having a size equal to a molecule free path and is formed so as to allow water vapor to pass therethrough by water-molecule capillary condensation and diffusion.

Further, the present invention provides a seventh solution means according to any one of the fourth to sixth solution means, the seventh solution means including a depressurizing means (36) which provides depressurization of one of the sides of the separation membrane in the demoisturizing means (22) so as to ensure a difference in partial pressure of water-vapor between both the separation membrane sides.

Further, the present invention provides an eighth solution means according to the seventh solution means, wherein a part or all of moisture separated from the compressed air by the demoisturizing means (22) is supplied to the low-temperature air from the expansion device (23).

Further, the present invention provides a ninth solution means according to the seventh solution means, the ninth solution means including a moisturizing means (42) which supplies moisture separated from the compressed air by the demoisturizing mans (22) to the conditioning air in the heating means (30).

Further, the present invention provides a tenth solution means according to any one of the fourth to seventh solution means, wherein a part or all of moisture separated from the compressed air by the demoisturizing means (22) is supplied, together with the conditioning air, into the room.

Further, the present invention provides an eleventh solution means according to any one of the fourth to sixth solution means, wherein the demoisturizing means (22) is formed so that one of surfaces of the separation membrane is brought into contact with the compressed air whereas the other of the surfaces is brought into contact with the conditioning air, whereby water vapor contained in the compressed air will travel to the conditioning air.

Further, the present invention provides a twelfth solution means according to any one of the first to eighth solution means, the twelfth solution means further comprising a moisturizing means (42) which supplies moisture to the conditioning air in the heating means (30).

Finally, the present invention provides a thirteenth solution means according to the ninth solution means or the twelfth solution means, wherein the moisturizing means (42) supplies moisture to the conditioning air through a moisture permeable membrane.

ACTION

In the first solution means, the compressor (21) draws in air from the outside and the inside of a room. In the compressor (21), the drawn air is compressed, thereby changing to high-temperature, high-pressure, compressed air. This compressed air is subjected to heat exchange with air for conditioning in the heating means (30). Then, the conditioning air heated by the heating means (30) is supplied into the room for effecting heating. On the other hand, the post-heat exchange compressed air is expanded in the expansion device (23) and changes to low-temperature air, thereafter being expelled to the outside of the room.

Further, in the second solution means, exhaust air for ventilation is drawn into the compressor (21). That is, the operation of heating is performed making utilization of the exhaust air.

Further, in the third solution means, supply air is heated together with room air by the heating means (30) and thereafter supplied into the room.

Further, in the fourth solution means, the demoisturizing means (22) removes moisture from the compressed air compressed by the compressor (21). At that time, the demoisturizing means (22) is provided with a specified separation membrane, so that the moisture in the compressed air is separated from the compressed air in the form of water vapor.

Further, in the fifth or sixth solution means, the separation membrane is formed by a given process so that it allows water vapor to pass therethrough.

Further, in the seventh solution means, depressurization provided by the depressurization means (36) ensures a difference in partial pressure of water-vapor between both the sides of the separation membrane. That is, one surface of the separation membrane comes into contact with the compressed air and the other surface thereof is depressurized by the depressurizing means (36). Accordingly, the partial pressure of water-vapor of the other surface of the separation membrane is held lower than that of the compressed air.

Further, in the eighth solution means, moisture separated from the compressed air by the demoisturizing means (22) is expelled to the outside of the room, together with low-temperature air.

Further, in the ninth solution means, moisture separated from the compressed air by the demoisturizing means (22) is supplied to air for conditioning by the moisturizing means (42). At that time, the moisturizing means (42) provides a supply of moisture to the conditioning air which is being heated in the heating means (30).

Further, in the tenth solution means, moisture separated from the compressed air by the demoisturizing means (22) is supplied to air for conditioning and delivered, together with the conditioning air, into the room for room humidification.

Further, in the eleventh solution means, one surface of the separation membrane is brought into contact with the compressed air whereas the other surface thereof is brought into contact with the conditioning air. Accordingly, in a running condition that the conditioning air is lower in partial pressure of water-vapor than the compressed air, moisture in the compressed air travels to the exhaust air without any external action.

Further, in the twelfth solution means, the moisturizing means (42) provides a supply of moisture to the conditioning air. At that time, the moisturizing means (42) supplies moisture to the conditioning air which is being heated in the heating means (30).

Finally, in the thirteenth solution means, moisture is gradually supplied, through a specified moisture permeable membrane, to the exhaust air by the moisturizing means (42).

EFFECTS

In accordance with the above-stated solution means, the compressor (21) draws in air not only from the inside but also from the outside of a room, therefore ensuring a sufficient flow rate for the compressed air. That is, it is possible to ensure a flow rate for high-temperature, compressed air that exchanges heat with conditioning air in the heating means (30). Because of this, it is possible to ensure an amount of heat that is applied to the conditioning air in the heating means (30), thereby achieving a sufficient heating capacity.

Further, in accordance with the second solution means, heat held in the exhaust air for ventilation is recovered and the recovered heat is utilized to heat the conditioning air. As a result of such arrangement, it is possible to provide protection against the increase in heating load caused by ventilation.

Further, in accordance with the third solution means, a mixture of room air and supply air serves as air for conditioning. This makes it possible to supply, after heating low-temperature supply air from the outside of the room, the supply air into the room, thereby improving comfortability of the person present in the room. Furthermore, in the present solution means, the conditioning air temperature is lowered to a further extent in comparison with the case in which room air serves as conditioning air. Because of this, the compressed air temperature is further lowered by heat exchange with the conditioning air in the heating means (30). This reduces the drive input of the compressor (21), thereby providing an improved equipment efficiency, i.e., COP (coefficient of performance).

Further, in accordance with the fourth solution means, it is possible to demoisturize compressed air and then deliver it to the expansion device (23). Here, the temperature of the low-temperature air from the expansion device (23) becomes considerably low (for example, about—15 degrees centigrade). Because of this, if a large amount of moisture is held in the low-temperature air, this causes the moisture to freeze in the low-temperature air. If moisture freezing occurs in the low-temperature air, this produces the following harmful effects. That is, the moisture is emitted in a snow-like form to the outside of the room together with the low-temperature air or the moisture builds up in a passageway for blowout, resulting in clogging the passageway. On the other hand, with the present solution means, the compressed air is demoisturized and thereafter expanded, so that it is possible to perform operations without suffering from the above-described harmful effects.

Further, in accordance with the fifth or sixth solution means, it is possible to positively form the separation membrane with a specified function.

Further, in accordance with the seventh solution means, it is possible to ensure, in any running operation condition, a difference in partial pressure of water-vapor between both the sides of the separation membrane by the depressurization means (36), thereby making it possible to separate water vapor from the compressed air at all times by the demoisturizing means (22). This positively provides protection against the occurrence of harmful effects due to the freezing of moisture in the low-temperature air, as described above.

Further, in accordance with the eighth solution means, it is possible to expel water vapor separated from the compressed air to the outside of the room, together with low-temperature air. This eliminates the necessity to provide a structure for the processing of separated water vapor, thereby achieving structure simplification.

Further, in accordance with the ninth or twelfth solution means, it is possible to perform room humidification by supplying moisture to the conditioning air. In this case, when the supplied moisture evaporates, it takes away heat for latent heat from the conditioning air. Because of this, if no measurement is taken, the temperature of the conditioning air will fall. However, with the present solution means, there is provided a supply of moisture to the conditioning air in the heating means (30). Accordingly, it is possible to give, by heat exchange with the compressed air, an amount of heat for a latent heat of vaporization of the supplied moisture to the conditioning air. As a result, while maintaining the temperature of the conditioning air delivered from the heating means (30) into the room at a specified value, it is possible to perform conditioning air humidification. Particularly, in accordance with the ninth solution means, it is possible to utilize moisture separated from the compressed air by the demoisturizing means (22) for room humidification.

Further, in accordance with the tenth solution means, it is possible to utilize moisture separated from the compressed air by the demoisturizing means (22) for room humidification.

Further, in accordance with the eleventh solution means, it is possible to supply water vapor separated from the compressed air to the conditioning air in the form of water vapor. That is, when humidifying the conditioning air, no supplied moisture will be evaporated in the conditioning air. Therefore, the present solution means eliminates the necessity to supply an amount of heat for a latent heat of vaporization of the moisture to the conditioning air from the compressed air, in the heating means (30). Because of this, even when the compressed air and the conditioning air exchange the same amount of heat in the heating means (30), it is possible to heat the conditioning air to further higher temperatures. As a result, while maintaining heating capacity at high level, it is possible to perform room humidification.

Finally, in accordance with the thirteenth solution means, moisture is gradually supplied to the conditioning air, thereby ensuring that the supplied moisture is evaporated positively in the conditioning air. This therefore prevents moisture incapable of being evaporated from being emitted in the form of liquid droplets into the room, together with the conditioning air.

BEST MODE FOR CARRYING OUT THE INVENTION

Hereinafter, an embodiment of the present invention will be described in detail by making reference to the accompanying drawings.

Figure 1:
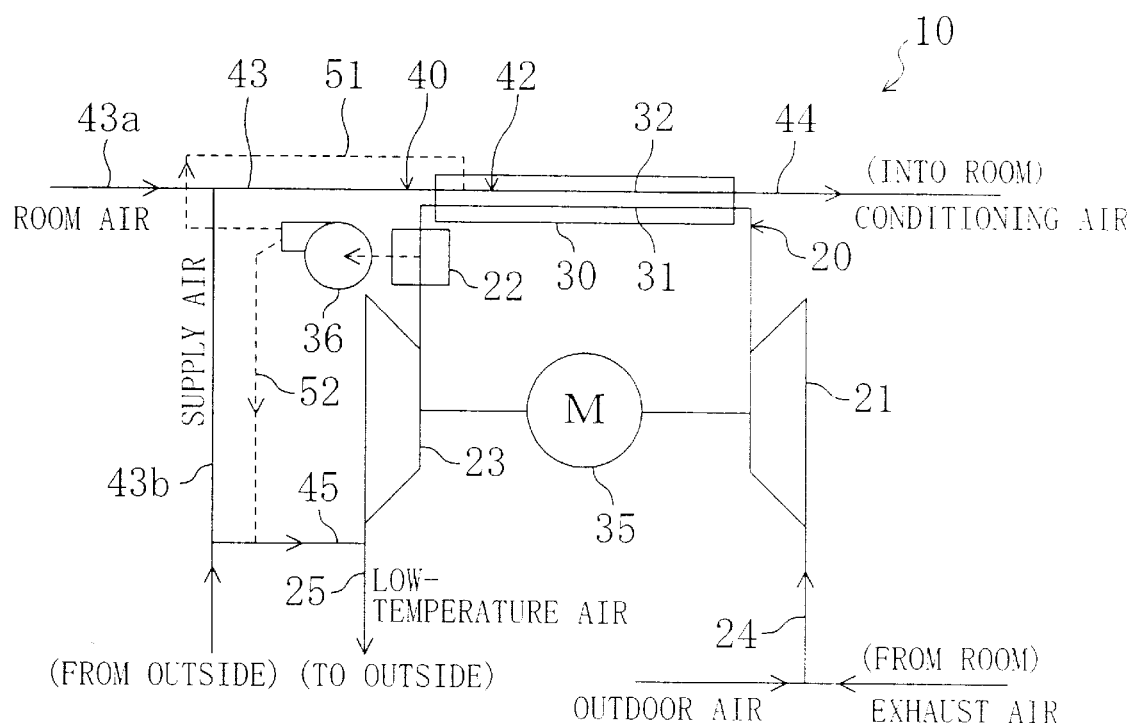
FIG. 1 is a schematic arrangement diagram showing an arrangement of an air-conditioning apparatus according to an embodiment of the present invention.

As shown in FIG. 1, an air-conditioning apparatus (10) of the present embodiment is comprised of a heat source-side system (20) and a utilization-side system (40).

The heat source-side system (20) is formed by establishing sequential duct connection of a compressor (21), a heat exchanger (30), a demoisturizer (22), and an expansion device (23), for performing an air refrigerating cycle. In addition, the heat source-side system (20) further includes a suction duct (24) connected to the inlet side of the compressor (21) and an emission duct (25) connected to the outlet side of the expansion device (23). The suction duct (24) is constructed such that it is divided, at its leader end side, into two branches, whereby air is delivered to the compressor (21) from the inside and the outside of a room. At that time, exhaust air expelled from the room for ventilation is delivered to the compressor (21) from the room. Further, the emission duct (25) is so formed as to guide low-temperature air from the expansion device (23) to outside the room.

The utilization-side system (40) is comprised of the heat exchanger (30), an inlet duct (43), and an outlet duct (44), wherein these ducts (43) and (44) are each connected to the heat exchanger (30). The inlet duct (43) branches off, at its leader end side, into a first inlet duct (43a) and a second inlet duct (43b). The first inlet duct opens, at its one end, to the room and the second inlet duct opens, at its one end, to the outside of the room. The second inlet duct is connected, at its halfway portion, to a branch duct (45) which is connected, at its one end, to the emission duct (25). The second inlet duct is constructed so that, of the room air flowing therethrough, a part thereof is guided to the heat exchanger (30) as supply air that is supplied into the room for ventilation and the remaining air is delivered to the emission duct (25). And the inlet duct (43) is so constructed as to deliver room air from the first inlet duct and supply air from the second inlet duct to the heat exchanger (30) as air for conditioning. Moreover, the outlet duct (44) opens, at its one end, to the inside of the room, whereby the conditioning air from the heat exchanger (30) is supplied into the room.

Connected to the compressor (21) is a motor (35). Further, the compressor (21) is connected to the expansion device (23). The compressor (21) is so configured as to be driven by driving force by the motor (35) and by expansion operation when air is expanded in the expansion device (23).

Zone formed in the heat exchanger (30) are a compressed air passageway (31) through which compressed air flows and a conditioning air passageway (32) through which conditioning air flows. The compressed air passageway (31) is duct connected, at its one end, to the compressor (21), whereas the other end thereof is duct connected to the demoisturizer (22). On the other hand, the conditioning air passageway (32) is duct connected, at its one end, to the inlet duct (43), whereas the other end thereof is duct connected to the outlet duct (44). The heat exchanger (30) is so configured as to perform heat exchange between the compressed air flowing through the compressed air passageway (31) and the conditioning air flowing through the conditioning air passageway (32). That is, the heat exchanger (30) constitutes a heating means for heating the conditioning air by heat exchange with the compressed air.

Further, mounted in the heat exchanger (30) is a humidifying part (42). The humidifying part (42) is equipped with a moisture permeable membrane. In the humidifying part (42), the conditioning air passageway (32) is formed of a moisture permeable membrane and a water-side space is defined opposite across the moisture permeable membrane. The moisture permeable membrane is formed so that it allows moisture to pass therethrough, wherein moisture in the water-side space penetrates through the moisture permeable membrane to the conditioning air in the conditioning air passageway (32). The humidifying part (42) constitutes a moisturizing means for supplying moisture to the conditioning air which is being heated in the heat exchanger (30).

The demoisturizer (22) has a separation membrane. Separated by the separation membrane are a high-pressure space and a low-pressure space. The high-pressure space is duct connected, at its inlet side, to the compressed air passageway (31) of the heat exchanger (30) whereas the outlet side thereof is duct connected to the expansion device (23). Accordingly, compressed air from the heat exchanger (30) flows through the high-pressure space. In the demoisturizer (22), water vapor in the compressed air penetrates through the separation membrane, as a result of which the water vapor travels from the high-pressure space side to the low-pressure space side. That is, the demoisturizer (22) constitutes a demoisturizing means capable of removal of moisture from the compressed air.

The separation membrane is implemented by a polymeric membrane such as fluororesin. The separation membrane is so constructed as to allow water vapor to pass therethrough by water molecule diffusion through the membrane inside. Further, the separation membrane may be formed of a porous membrane for gas separation formed of xerogel et cetera. In this case, moisture in the compressed air penetrates through the separation membrane by capillary condensation and diffusion of water molecules.

Connected to the low-pressure space of the demoisturizer (22) is a vacuum pump (36). The vacuum pump (36) is disposed for providing depressurization of the low-pressure space, which constitutes a depressurizing means for ensuring a difference in partial pressure of water-vapor between the low-pressure space and the high-pressure space.

Further, connected to the outlet side of the vacuum pump (36) are a first water line (51) and a second water line (52). The first water line (51) is connected to the water-side space of the humidifying part (42) of the heat exchanger (30), for supplying moisture separated from the compressed air in the demoisturizer (22) to the water-side space. On the other hand, the second water line (52) is connected to the branch duct (45), for supplying, together with air from the outside of the room, moisture separated from the compressed air in the demoisturizer (22) to the low-temperature air within the emission duct (25).

Running Operation

Figure 2:
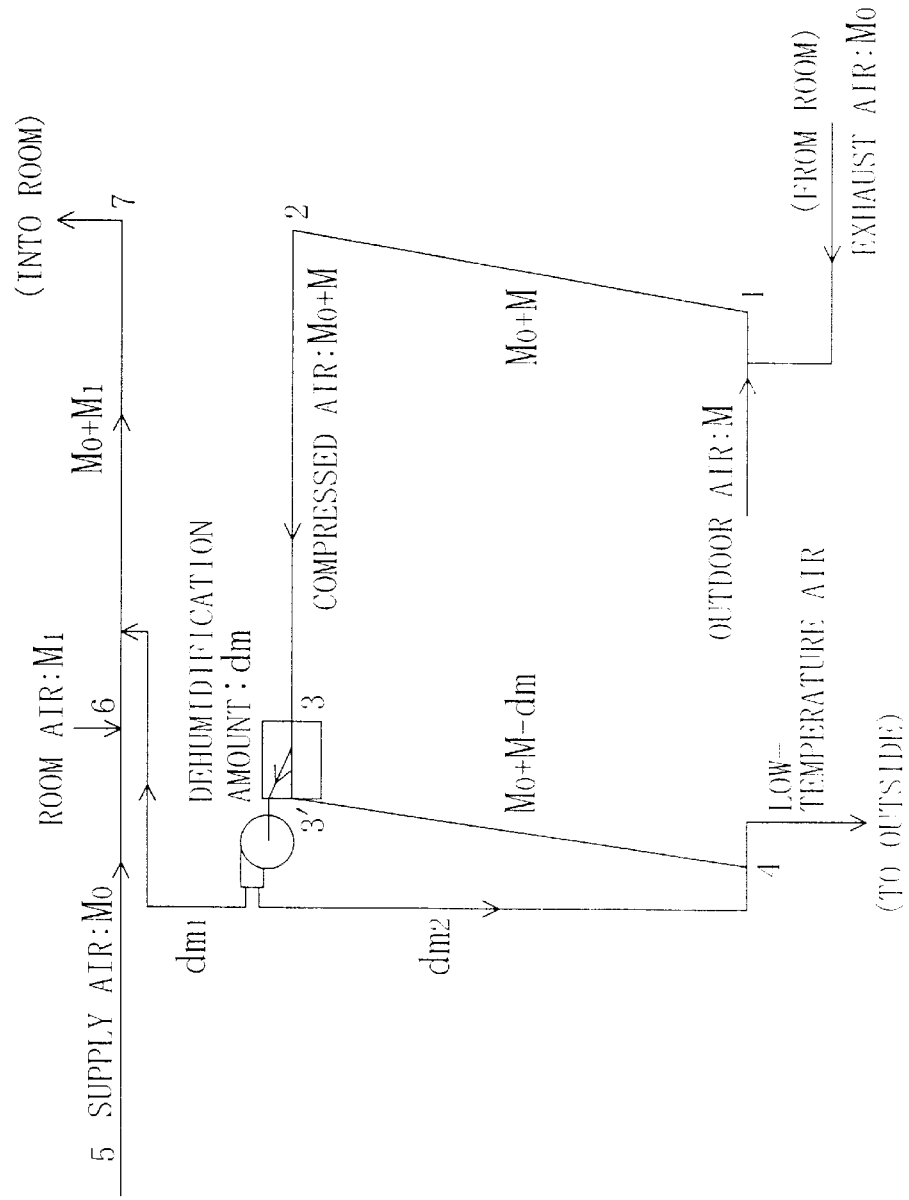
FIG. 2 is an air state diagram showing the operation of the air-conditioning apparatus of the embodiment.
Figure 3:
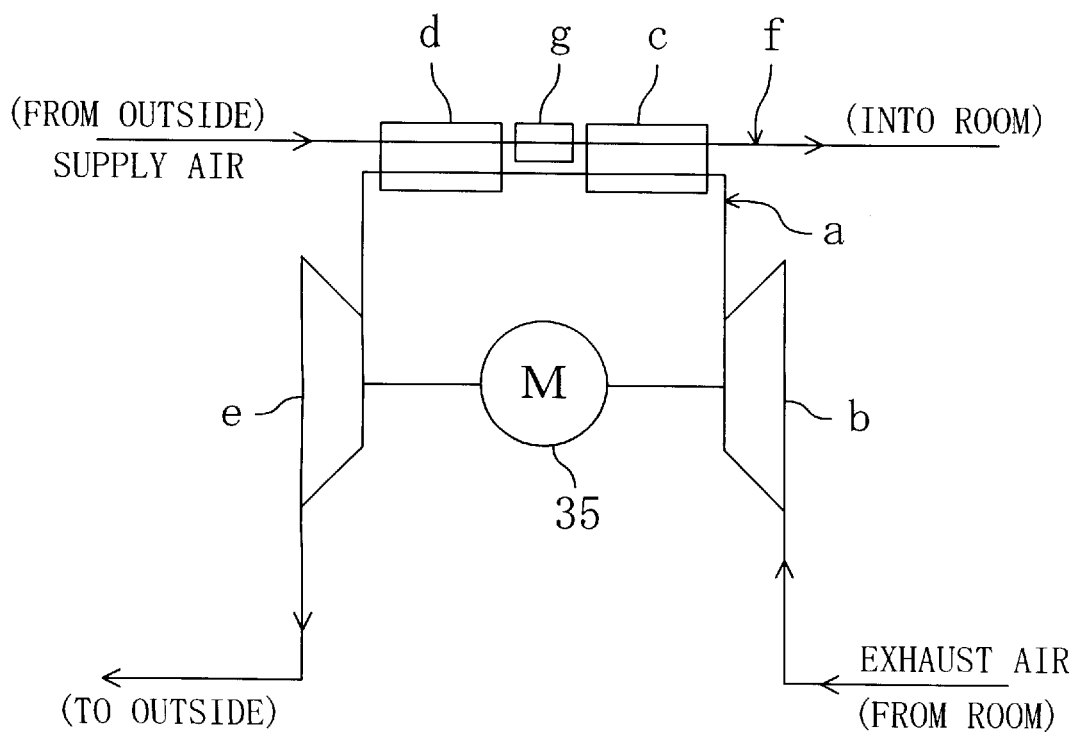
FIG. 3 is a schematic arrangement diagram showing an arrangement of a heating apparatus employing a conventional air cycle refrigerator as a heat source.

Next, running operation of the air-conditioning apparatus (10) will be explained with reference to FIG. 2.

When in the heat source-side system (20) the compressor (21) is driven by the motor (35), exhaust air and air from the outside of the room are fed to the compressor (21) through the suction duct (24). More specifically, exhaust air (flow rate: MO) and air from the outside of the room (flow rate: M) are mixed with each other and the mixture is supplied to the compressor (21). In the compressor (21), the air thus supplied is subjected to compression in a range from Point 1 to Point 2, thereby generating compressed air of a flow rate of MO+M. The compressed air, whose temperature has become high by compression, is delivered to the compressed air passageway (31) of the heat exchanger (30).

In the heat exchanger (30), while the high-temperature, compressed air is flowing through the compressed air passageway (31) it exchanges heat with the conditioning air flowing through the conditioning air passageway (32). That is, the compressed air exchanges heat with the conditioning air in a range from Point 2 to Point 3 and its temperature is lowered.

In the demoisturizer (22), a moisture: dm is removed from the compressed air in a range from Point 3 to Point 3'. More specifically, in the demoisturizer (22), the low-pressure space is depressurized by the vacuum pump (36), so that the partial pressure of water-vapor of the low-pressure space is maintained lower than that of the high-pressure space at all times. Such a difference in partial pressure of water-vapor between both the spaces allows water vapor in the compressed air to penetrate through the separation membrane for removal of the moisture in the compressed air. At that time, the water vapor in the compressed air is separated from the compressed air in the form of water vapor without undergoing condensation.

Thereafter, the demoisturized, compressed air is delivered to the expansion device (23). In the expansion device (23), the compressed air is expanded in a range from Point 3' to Point 4, thereby becoming low-temperature air. Then, the low-temperature air is expelled, through the emission duct (25), to the outside of the room. At that time, air from outside the room is delivered, through the branch duct (45), into the emission duct (25). Accordingly, the low-temperature air is mixed with a specified amount of outdoor air and thereafter expelled to the outside of the room.

On the other hand, in the utilization-side system (40), supply air (flow rate: MO) and room air (flow rate: M1) are delivered, through the inlet duct (43), to the conditioning air passageway (32) of the heat exchanger (30). That is, the supply air whose flow rate is the same as the exhaust air is delivered, together with a specified amount of room air, to the heat exchanger (30).

In the conditioning air passageway (32) of the heat exchanger (30), the conditioning air is subjected to heat exchange with the compressed air flowing through the compressed air passageway (31) in a range from Point 6 to Point 7 and, as a result, the conditioning air is heated, during which in the humidifying part (42) of the heat exchanger (30) a moisture (dm1) is supplied to the conditioning air flowing through the conditioning air passageway (32). That is, there is provided a supply of moisture to the conditioning air which is being heated in the humidifying part (42). Accordingly, the conditioning air is fed an amount of heat for a latent heat of vaporization of the supplied moisture by heat exchange with the compressed air. In this way, heating and humidification of the conditioning air are carried out.

The moisture (dm1) supplied to the conditioning air in the humidifying part (42) is a part of the moisture (dm) separated from the compressed air in the demoisturizer (22), wherein the moisture (dm1) is supplied, through the first water line (51), to the humidifying part (42).

The conditioning air heated and humidified in the heat exchanger (30) is supplied, through the outlet duct (44), into the room. As a result, room heating/humidification is carried out.

EFFECTS OF THE EMBODIMENT

In accordance with the present embodiment, the compressor (21) draws therein outdoor air together with exhaust air from the room, thereby making it possible to ensure a sufficient compressed air flow rate. In other words, it is possible to ensure a flow rate for the high-temperature, compressed air that is subjected to heat exchange with the conditioning air in the heat exchanger (30). It is therefore possible to ensure an amount of heat that is applied to the conditioning air in the heat exchanger (30), thereby achieving a sufficient heating capacity.

Further, by the delivering of exhaust air to the compressor (21), it becomes possible to recover heat held in the exhaust air for ventilation and make utilization of the recovered heat for the heating of conditioning air. This provides protection against the increase in heating load caused by ventilation.

Further, a room air/supply air mixture serves as conditioning air, as a result of which arrangement it becomes possible to heat low-temperature supply air from outside the room and thereafter supply it into the room. This improves comfortability of the person present in the room. Further, in the present embodiment, the conditioning air temperature is lowered to a further extent in comparison with the case in which room air serves as conditioning air. Because of this, the compressed air temperature is lowered to a much further extent by heat exchange with the conditioning air in the heat exchanger (30), thereby making it possible to reduce the driving input of the compressor (21). As a result, it is possible to improve equipment efficiency, that is, COP (coefficient of performance).

Further, it is arranged such that moisture is separated from the compressed air in the demoisturizer (22) and thereafter delivered to the expansion device (23). Here, if the low-temperature air after expansion contains therein much moisture, the moisture will freeze in the low-temperature air. Such frozen moisture is collected in an air passageway, therefore causing harmful effects such as passageway clogging. On the other hand, in accordance with the present embodiment, the compressed air is subjected to expansion after moisture removal, so that it is possible to perform running operations without suffering from the above-described harmful effects.

Further, it is possible to ensure a difference in partial pressure of water-vapor between both the sides of the separation membrane by the vacuum pump (36) and it is therefore possible to separate water vapors from the compressed air at all times by the demoisturizer (22). This ensures that the above-described harmful effect caused by moisture freezing in the low-temperature air is positively prevented from taking place.

Further, in the present embodiment, the low-temperature air is mixed with a given amount of outdoor air and thereafter expelled to outside the room. This makes it possible to make the temperature of air that is emitted to outside the room higher than that of the low-temperature air immediately after its emission from the expansion device (23). This accordingly ensures that the above-described harmful effect of moisture freezing in the low-temperature air is positively prevented from taking place.

Further, it is possible to make utilization of moisture, separated from the compressed air by the demoisturizer (22), for room humidification. At that time, it is arranged such that the moisture is supplied to the conditioning air in the humidifying part (42) of the heat exchanger (30). Therefore, an amount of heat for a latent heat of vaporization of the moisture supplied can be applied to the conditioning air by heat exchange with the compressed air. As a result, it is possible to achieve conditioning air humidification while maintaining the temperature of the conditioning air that is delivered from the heat exchanger (30) into the room at a given value.

Further, in the humidifying part (42), a supply of moisture to the conditioning air is carried out little by little through the moisture permeable membrane, so that the moisture supplied can be evaporated positively in the conditioning air. Because of this, it is possible to provide protection against emission of moisture incapable of being evaporated into the room in the form of liquid droplets together with the conditioning air.

First Variation

In the above-described embodiment, a supply of moisture separated from the compressed air in the demoisturizer (22) is provided to the conditioning air through the first water line (51) and to the low-temperature air through the second water line (52). However, the moisture is not necessarily supplied to both of the conditioning air and the low-temperature air. The moisture may be supplied either to the exhaust air or to the low-temperature air.

Second Variation

Further, in the above-described embodiment, a supply of moisture is provided, through the first water line (51), to the humidifying part (42) of the heat exchanger (30). However, an arrangement may be made in which tap water et cetera is supplied to the humidifying part (42) and then to the conditioning air.

Third Variation

Further, in the above-described embodiment, a supply of moisture separated from the compressed air in the demoisturizer (22) is provided to the humidifying part (42). However, an arrangement may be made in which one end of the first water line (51) is connected to the inlet duct (43) and the separated moisture is supplied to the conditioning air within the inlet duct (43). Further, another arrangement may be made in which one end of the first water line (51) is connected to the outlet duct (44) and the separated moisture is supplied to the conditioning air heated in the heat exchanger (30).

Fourth Variation

Further, in the above-described embodiment, the demoisturizer (22) is interposed between the heat exchanger (30) and the expansion device (23) in the heat source-side system (20). However, an arrangement may be made in which the demoisturizer (22) is interposed between the compressor (21) and the heat exchanger (30) and moisture is separated from the compressed air prior to heat exchange with the conditioning air in the heat exchanger (30). Furthermore, like the third variation, also in the present variation, moisture separated from the compressed air may be supplied either to the conditioning air within the inlet duct (43) or to the conditioning air within the out let duct (44).

Fifth Variation

Moreover, in the above-described embodiment, the low-pressure space of the demoisturizer (22) is subjected to depressurization by the vacuum pump (36), whereby moisture is separated from the compressed air by the demoisturizer (22). However, an arrangement may be made in which the vacuum pump (36) is not provided and the configuration of the demoisturizer (22) is changed so that water vapor in the compressed air passes through the separation membrane and moves to the conditioning air.

That is, defined in the demoisturizer are a heat source-side space and a utilization-side space which are separated from each other by a separation membrane. Compressed air from the heat exchanger (30) is directed to the heat source-side space. On the other hand, the inlet duct (43) of the utilization-side system (40) is connected to the utilization-side space and the utilization-side space is defined at a halfway portion of the inlet duct (43). Owing to the difference in partial pressure of water-vapor created between the heat source-side space and the utilization-side space, water vapor in the compressed air penetrates through the separation membrane and travels to the conditioning air. Thereafter, the water vapor thus separated is supplied, together with the conditioning air, into the room for humidification thereof.

In accordance with the present variation, it is possible to supply to the conditioning air water vapor separated from the compressed air in the form of water vapor. That is, at the time of conditioning-air humidification, the moisture supplied will not be evaporated in the conditioning air. This accordingly eliminates the necessity to supply from the compressed air to the conditioning air an amount of heat for a latent heat of vaporization of the moisture in the heat exchanger (30). Because of this, even when the compressed air and the conditioning air exchange the same amount of heat in the heat exchanger (30), it is possible to heat the conditioning air to further higher temperatures. As a result, it is possible to achieve room humidification while maintaining high heating capacity.

INDUSTRIAL APPLICABILITY

As described above, the air-conditioning apparatus of the present invention is useful for room heating and particularly applicable to air cycle heating.

What is claimed is:

1. An air-conditioning apparatus which heats room air by an air cycle employing air as a refrigerant for performing air-heating, comprising:

a compressor (21) which draws in air from the outside and the inside of a room for compressing said drawn air;

heating means (30) which heats air for conditioning formed of at least air from said room by heat exchange with all said compressed air compressed by said compressor (21); and an expansion device (23) which provides expansion of said compressed air which has undergone said heat exchange in said heating means (30);

wherein low-temperature air, expanded and lowered in temperature in said expansion device (23), is expelled to the outside of said room, whereas said conditioning air heated by said heating means (30) is supplied into said room.

2. The air-conditioning apparatus of claim 1, wherein said air that is drawn into said compressor (21) from the inside of said room is exhaust air that is expelled from the inside of said room for ventilation.

3. The air-conditioning apparatus of claim 1 or claim 2, wherein said conditioning air is formed of air from said room and supply air that is supplied from the outside to the inside of said room.

4. An air-conditioning apparatus which heats room air by an air cycle employing air as a refrigerant for performing air-heating, comprising:

a compressor (21) which draws in air from the outside and the inside of a room for compressing said drawn air;

heating means (30) which heats air for conditioning formed of at least air from said room by heat exchange with all said compressed air compressed by said compressor (21); and an expansion device (23) which provides expansion of said compressed air which has undergone said heat exchange in said heating means (30); and demoisturizing means (22) which has a separation membrane, said separation membrane being formed such that water vapor in the air is allowed to pass therethrough from a high partial pressure of water-vapor side to a low partial pressure of water-vapor side thereof, for separation of water vapor contained in said compressed air without causing said water vapor to undergo condensation;

wherein low-temperature air, expanded and lowered in temperature in said expansion device (23), is expelled to the outside of said room, whereas said conditioning air heated by said heating means (30) is supplied into said room.

5. The air-conditioning apparatus of claim 4, wherein said separation membrane is composed of a polymeric membrane and formed so as to allow water vapor to pass therethrough by water-molecule diffusion in said membrane.

6. The air-conditioning apparatus of claim 4, wherein said separation membrane has a large number of pores having a size equal to a molecule free path and is formed so as to allow water vapor to pass therethrough by water-molecule capillary condensation and diffusion.

7. The air-conditioning apparatus of any one of claims 4–6 further comprising depressurizing means (36) which provides depressurization of one of said sides of said separation membrane in said demoisturizing means (22) so as to ensure a difference in partial pressure of water-vapor between both said separation membrane sides.

8. The air-conditioning apparatus of claim 7, wherein a part or all of moisture separated from said compressed air by said demoisturizing means (22) is supplied to said low-temperature air from said expansion device (23).

9. The air-conditioning apparatus of claim 7 further comprising moisturizing means (42) which supplies moisture separated from said compressed air by said demoisturizing mans (22) to said conditioning air flowing through said heating means (30).

10. The air-conditioning apparatus of claim 4, wherein a part or all of moisture separated from said compressed air by said demoisturizing means (22) is supplied, together with said conditioning air, into said room.

11. The air-conditioning apparatus of any one of claims 4–6, wherein said demoisturizing means (22) is formed so that one of surfaces of said separation membrane is brought into contact with said compressed air whereas the other of said surfaces is brought into contact with said conditioning air, whereby water vapor contained in said compressed air will travel to said conditioning air.

12. The air-conditioning apparatus of claim 1, further comprising moisturizing means (42) which supplies moisture to said conditioning air in said heating means (30).

13. The air-conditioning apparatus of claim 9 or claim 12, wherein said moisturizing means (42) supplies moisture to said conditioning air through a moisture permeable membrane.

14. The air-conditioning apparatus of claim 4, further comprising moisturizing means (42) which supplies moisture to said conditioning air in said heating means (30).

* * * * *

UNITED STATES PATENT AND TRADEMARK OFFICE
CERTIFICATE OF CORRECTION

| | | |
|---|---|---|
| PATENT NO. | : 6,484,528 B1 | Page 1 of 1 |
| DATED | : November 26, 2002 | |
| INVENTOR(S) | : Chun-Cheng Piao et al. | |

It is certified that error appears in the above-identified patent and that said Letters Patent is hereby corrected as shown below:

<u>Title page, Item [54] and Column 1, line 1,</u>
Title should read -- AIR-CONDITIONING APPARATUS --

Signed and Sealed this

Thirtieth Day of September, 2003

JAMES E. ROGAN
*Director of the United States Patent and Trademark Office*